Sept. 8, 1953

H. W. ALDEN 2,651,216

DIFFERENTIAL MOUNTING AND CARRIER

Filed Feb. 28, 1949

INVENTOR.
HERBERT W. ALDEN
BY
*Strauch & Hoffman*
ATTORNEYS

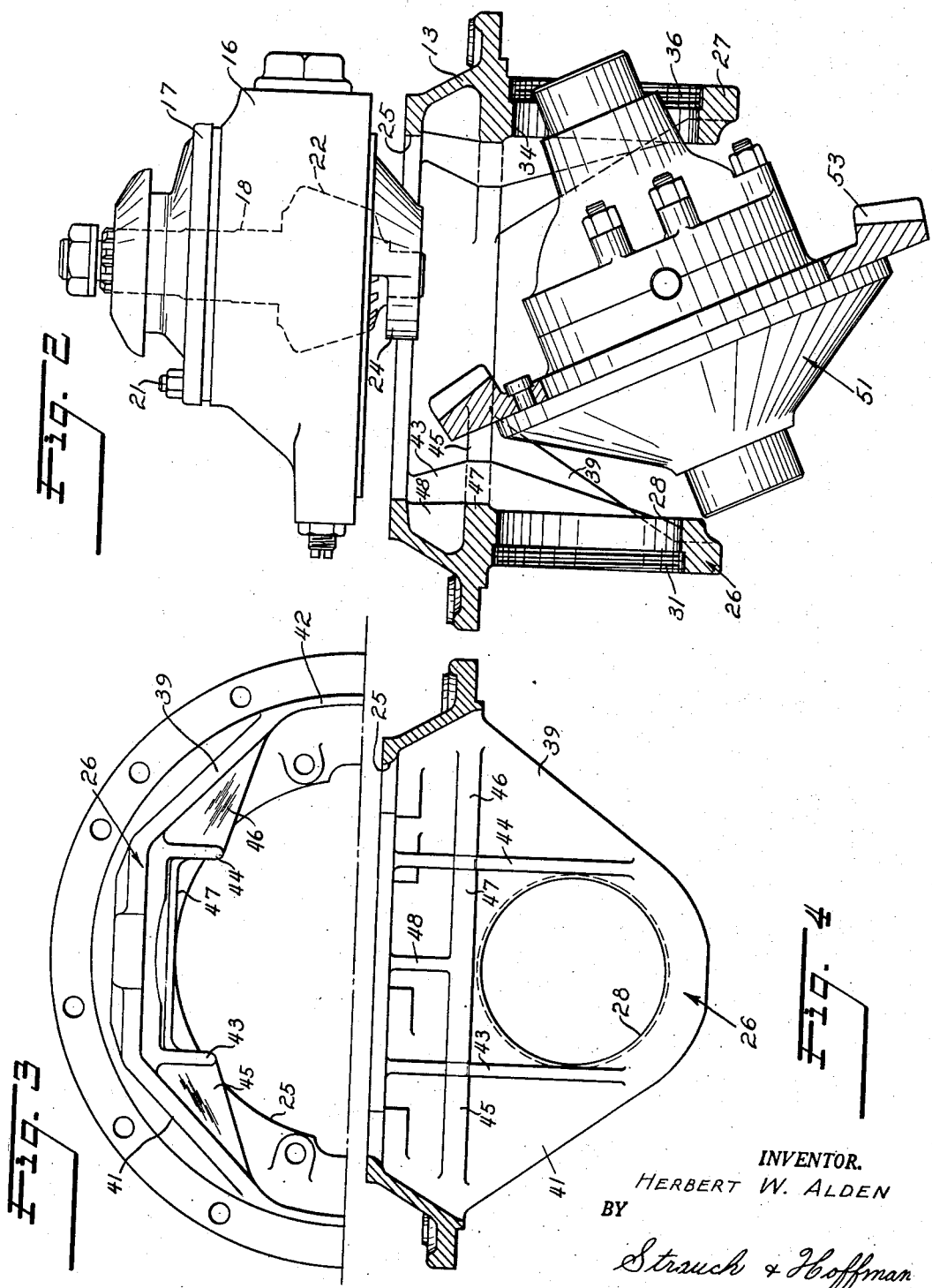

Patented Sept. 8, 1953

2,651,216

UNITED STATES PATENT OFFICE 2,651,216

DIFFERENTIAL MOUNTING AND CARRIER

Herbert W. Alden, Detroit, Mich., assignor to The Timken-Detroit Axle Company, Detroit, Mich., a corporation of Ohio Application February 28, 1949, Serial No. 78,690

4 Claims. (Cl. 74—713)

This invention relates to vehicle drive axles and more particularly to improvements in differential mounting arrangements.

In the rear drive axle of the conventional motor vehicle, the pinion shaft which is driven from the motor carries a drive pinion and is rotatably mounted upon an axis that extends longitudinally of the vehicle and normal to the vertical plane containing the axis of the drive axle. The usual drive axle construction comprises a housing that is enlarged intermediate its ends to support differential gearing, and drive shafts extend outwardly on the axis of the drive axle to the wheels. The usual differential gearing is enclosed in a casing that is rotatable on bearings about the axis of the axle and provided with a radial bevel gear secured on or integral with the periphery of the casing.

This bevel gear is meshed with the drive pinion within the axle housing, and a vertical plane parallel to the pinion shaft axis and bisecting the line of contact of the pinion and bevel gears is appreciably laterally displaced with respect to the pinion shaft axis whereby the differential casing is subjected to end thrust when the axle is driven. It has been the custom to support the differential casing at opposite ends in tapered roller bearing assemblies. Due to the offset relation of the pinion axis and the bevel gear one of these tapered roller bearings, the bearing on the side that the bevel gear is offset is subjected to most and usually all of the end thrust and it consequently wears much faster than the tapered roller bearing on the other side of the differential casing. As this tapered roller bearing taking the major part of the end thrust becomes worn, its cone moves axially deeper into its cup under the urge of the end thrust while still remaining concentric with the cup, thereby permitting and causing the differential casing to shift axially so that the cone of the bearing on the other end of the differential casing is pulled out of its cup and thereby permitted to drop slightly, destroying the concentricity of that cup and cone and tilting the axis of rotation of the differential casing out of alignment with the axle shafts. The resultant tilted axis of the differential increases the load and wear on the bearings since movement of the casing becomes gyratory, and it also destroys the meshed alignment between the drive pinion and the bevel drive gear on the differential housing and causes increased tooth wear. The misalignment between the axle shafts and the differential casing causes increased wear in these parts.

Adjustments are usually provided for the tapered roller bearings on both sides of the conventional differential casing, but unless these adjustments are made periodically they cannot halt this acceleration of wear. Usually the average operator does not realize the need for adjustment until the axle becomes noisy or fails, and by that time replacement, not repair or adjustment of the axle drive, is necessary.

I have observed this unequal wear of the tapered roller bearings supporting the differential casing and the above difficulties, and have discovered that this objectionable tilting of the differential casing can be entirely eliminated by substituting a simple radial bearing, such as a ball bearing asssembly ring, for the tapered roller bearing which is on the side opposite that subjected to the major end thrust. In this manner as the tapered roller bearing wears I insure against tilting of the axis of rotation of the differential casing because any axial displacement of the differential casing toward the wearing tapered roller bearing results only in a relative axial sliding within permissible limits of end play at the ball bearing assembly. If desired, a cylindrical roller bearing or any other suitable radial bearing could be used in place of the ball bearing but the latter is preferred because of its lower cost and high antifriction properties.

In the illustrated embodiment of the invention, my novel manner of supporting the differential casing will be described hereinafter in detail. The invention also includes mounting of the differential casing on integral legs of a carrier removable from the axle housing, together with a special carrier leg reinforcing rib construction that provides a stronger and longer lasting axle drive assembly than the conventional arrangements in use prior to the invention. Also the invention provides a special multi-part carrier and differential assembly that results in a compact drive unit of maximum strength and optimum ease of assembly and separability for replacement and repair.

It is therefore the major object of this invention to provide a novel bearing and support arrangement for preventing axial misalignment of the differential casing in a vehicle drive axle.

A further object of my invention is to provide a novel differential casing bearing arrangement wherein the casing is supported at the side subjected to heavy end thrust by a tapered roller bearing in such a manner as to oppose the end thrust, and is supported at the other end in a radial bearing so that the casing is maintained upon the same axis of rotation regardless of axial movement of the casing incident to the wear of the tapered roller bearing.

It is a further object of this invention to provide a novel differential carrier for a drive axle assembly wherein the differential casing is journalled in spaced integral legs of a differential carrier and special reinforcing ribs are provided that extend to the lower ends of the legs.

It is an important further object of this invention to provide a novel compact differential and carrier assembly made up of a plurality of separable parts which must be secured together in predetermined order in the assembly. Pursuant to this object the part on which the pinion is straddle mounted is separable from the part on which the differential casing is journalled to enable the differential casing to be rocked into position on its bearings without interference from any portion of the pinion mounting part, which latter is then incorporated into the assembly to locate the pinion in mesh with the bevel gear on the differential casing.

These and other objects will become apparent as the specification proceeds in connection with the appended claims and annexed drawings, wherein:

Figure 2 is an exploded view partly in section illustrating the manner of assembly of the axle center-section according to the invention.

Figure 3 is an elevational view of one half of the carrier part looking up from the bottom of Figure 2 illustrating the carrier leg and rib structure; and Figure 4 is an axial section illustrating one of the integral legs on the carrier and the reinforcing rib structure.

The specification now continues with reference to the drawings, wherein like reference numerals or characters designate like parts throughout the several figures.

Figure 1:
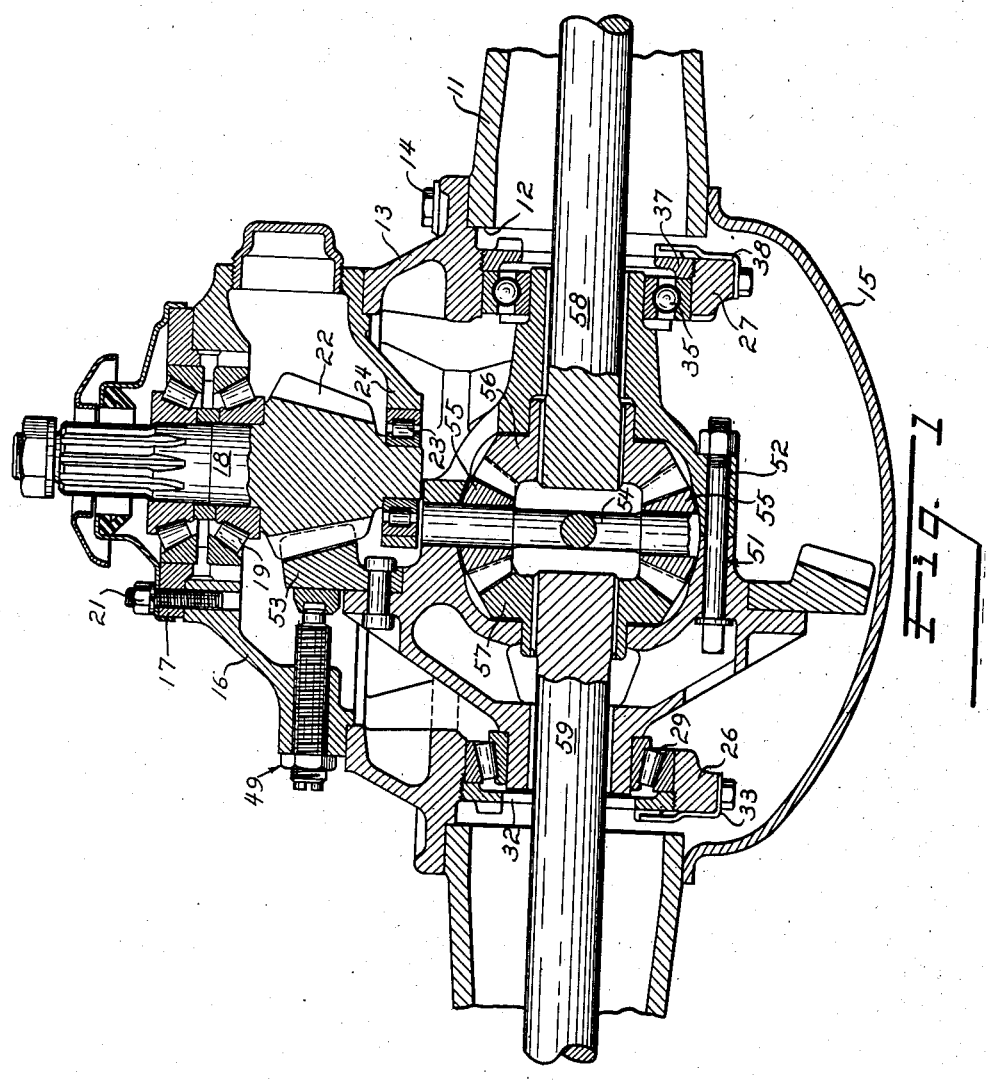
Figure 1 is a top plan view mainly in section illustrating the improved differential mounting and differential carrier according to a preferred embodiment of this invention.

A conventional banjo-type axle housing 11 is provided with a front opening 12 in which a differential carrier assembly is piloted and removably secured to housing 11 as by a series of bolts 14. A bowl 15 of the usual type is welded to housing 11 rearwardly of the carrier.

The carrier assembly comprises three separable parts, a differential casing mounting part 13 which is secured directly to housing 11 by bolts 14, a pinion housing 16 piloted in the front opening of part 13 and secured thereto by bolts (not shown), and a bearing cage 17 closing the front end of pinion housing 16. Pinion shaft 18 is rotatably mounted in a bearing assembly 19 in cage 17. Cage 17 is preferably removably secured to housing 16 as by a series of studs 21. A pinion 22 is integral with shaft 18 which is formed with a reduced end portion journalled in a radial bearing 23 in a web 24 integral with pinion housing 16.

Carrier part 13 (Figures 1 and 4), opposite its front opening rim 25 over which pinion housing 16 is secured, is provided with integral spaced legs 26 and 27 that extend into the axle housing and support the differential casing in the assembly. Leg 26 is formed with a cylindrical bore 28 for receiving the outer race of a tapered roller bearing assembly 29. Bore 28 is threaded at 31 for reception of an annular adjustment and retainer member 32 having a suitable locking device 33. Leg 27 is formed with a similar and aligned cylindrical bore 34 for receiving the outer race of a ball bearing assembly 35, and bore 34 is threaded at 36 for reception of an adjustment and retainer member 37 locked by a suitable device 38.

Carrier part 13 is formed with an internal depending reinforcing rib construction that extends from the body of carrier part 13 down to the lower ends of legs 26 and 27. This rib structure, as illustrated best in Figures 2–4, is the same on the inside surfaces of each leg 26 and 27.

Referring to Figure 3, which illustrates leg 26 as viewed from opposite the pinion, similar webs 39 and 41 extend integrally from an internal rim 42 concentric with rim 25 and merge integrally into the lower end of leg 26. Each web 39 and 41 is integrally secured to rim 42 over a wide sector and decreases in width as it approaches the bottom of leg 26 so that webs 39 and 41 provide a triangular rib laterally reinforcing the leg 26. Webs 39 and 41, as illustrated in Figure 3, extend substantially equi-angularly from opposite sides of leg 26.

At opposite sides of bore 28, webs 43 and 44 which are parallel to each other and extend substantially parallel to the axis of rotation of the differential casing are integrally joined with leg 26 and webs 39 and 41 and extend from the lower end of leg 26 up to rim 25 as illustrated in Figure 4. Where webs 43 and 44 cross rim 42 they are integrally joined to lateral webs 39 and 41 respectively by webs 45 and 46 that extend at right angles to both of them and appear in plan in Figure 3 as triangular webs interconnecting these webs.

Between webs 43 and 44 on the upper part of leg 26 and above bore 28 is a transverse integral web 47 and a short web 48 extends between web 47 and rim 25 parallel to webs 43 and 44 and in a plane passing through the axis of bore 28.

The above described web structure integral with leg 26 reinforces the leg against possible deflection incidental to axle operation without requiring an excessive amount of metal in the carrier part 13, and as above stated the inner side of web 27 is similarly reinforced.

An adjustable backing member 49 is provided for limiting deflection of gear 53 during operation of the axle.

A conventional two piece differential casing 51 held together by studs 52 and having a bevel gear 53 secured thereto is rotatably mounted on carrier part 13 by having one end journalled in tapered roller bearing 29 and its other end journalled in ball bearing 35. The differential casing includes a spider 54 that carries pinions 55 meshed with side gears 56 and 57 which are splined on drive axle shafts 58 and 59.

In assembling the axle center section, the assembled differential casing with the bevel drive gear thereon is inclined and inserted into position between the differential carrier legs in the manner illustrated in Figure 2 and rocked into substantially final position. The end bearings 29 and 35 are then pressed into place and the adjusting members positioned to correctly locate the differential casing with respect to the carrier. While the differential casing is being so assembled with the carrier part 13 it is essential that the pinion housing 16 should not yet be attached to carrier part 13 as the web 24 would block the differential casing from being rocked into position between the carrier legs.

After the differential casing has been assembled to carrier part 13, the pinion assembly unit comprising housing 16 and cage 17 bolted together and mounting the pinion shaft is secured to the carrier part 13 with pinion 22 meshed with bevel gear 53.

During drive operation of the axle, the pinion rotates the differential casing concentrically with the axle shaft and this concentricity is maintained even when the bearing cone at 29 becomes worn, by reason of the special bearing arrangements on the carrier legs. The special web structures on the carrier part 13 provide reinforcing ribs that brace each carrier leg down to its lower end and resist spreading or other deflection of those legs during axle operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle drive axle, a differential carrier member having an axle attachment portion, spaced parallel integral legs projecting from said portion, said legs being formed with aligned bores for journalling a differential casing, and reenforcing means on the inner side of each of said integral legs comprising substantially triangular side webs each having its base merged with said axle attachment portion over a large peripheral sector and decreasingly tapered toward the bottom of the associated bore, parallel integral substantially triangular webs projecting longitudinally from each leg on opposite sides of the associated bore and decreasingly tapered from said axle attachment portion to the lower end of said leg, and outwardly extending substantially triangular transverse webs on each leg, each having sides integral with the associated parallel and side webs respectively.

2. In the drive axle defined in claim 1, said transverse webs being aligned with each other, and a further integral web projecting from each leg above the bore and extending between the associated parallel legs.

3. In a vehicle drive axle, a differential carrier having a part for attachment to an axle housing and a projecting pair of opposed integral legs formed with aligned bearing receiving bores, each of said legs being generally triangular with its base portion merged over a large sector with said axle housing attachment part and having angularly extending side webs on opposite sides below said axle housing attachment part, and a pair of integral reinforcing webs on each of said legs projecting inwardly from said legs and extending from said axle attachment part alongside said bores to the remote ends of said legs.

4. In a vehicle drive axle, a differential carrier member having a part adapted to be attached to an axle housing and spaced parallel integral legs projecting from said axle attachment part and formed with aligned bearing receiving bores, integral lateral reinforcing webs extending angularly from opposite sides of said legs at opposite sides of each bore and extending from said axle attachment part to the remote ends of said legs, each of said lateral webs having a base portion merged with said axle attachment part over a large peripheral sector and decreasing in width toward the bottom of said bore, and longitudinal, inwardly projecting integral webs on said legs on opposite sides of said bores and extending from said axle housing attachment part alongside said bores and down to the lower ends of said legs.

HERBERT W. ALDEN.

References Cited in the file of this patent

UNITED STATES PATENTS

| Number | Name | Date |
|---|---|---|
| 1,159,652 | Culver et al. | Nov. 9, 1915 |
| 1,168,245 | Brush | Jan. 11, 1916 |
| 1,434,578 | Alden | Nov. 7, 1922 |
| 1,506,037 | Alden | Aug. 26, 1924 |
| 1,506,365 | Domizi | Aug. 26, 1924 |
| 1,556,707 | Moorhouse | Oct. 13, 1925 |
| 1,721,535 | Taub | July 23, 1929 |
| 1,828,025 | Church | Oct. 20, 1931 |
| 1,880,655 | Baits | Oct. 4, 1932 |
| 1,944,612 | Repeck | Jan. 23, 1934 |
| 2,043,006 | Morgan | June 2, 1936 |
| 2,053,929 | Wiedmaier | Sept. 8, 1936 |
| 2,056,881 | Alden | Oct. 6, 1936 |
| 2,068,438 | Starr | Jan. 19, 1937 |
| 2,510,996 | Morgan | June 13, 1950 |

FOREIGN PATENTS

| Number | Country | Date |
|---|---|---|
| 443,067 | Germany | Apr. 19, 1927 |